(12) United States Patent
Meurs

(10) Patent No.: US 8,943,437 B2
(45) Date of Patent: Jan. 27, 2015

(54) DISAMBIGUATION OF USSD CODES IN TEXT-BASED APPLICATIONS

(75) Inventor: Pim van Meurs, Kenmore, WA (US)

(73) Assignee: Nuance Communications, Inc., Burlington, MA (US)

( * ) Notice: Subject to any disclaimer, the term of this patent is extended or adjusted under 35 U.S.C. 154(b) by 480 days.

(21) Appl. No.: 12/816,247

(22) Filed: Jun. 15, 2010

(65) Prior Publication Data

US 2010/0317381 A1 Dec. 16, 2010

Related U.S. Application Data

(60) Provisional application No. 61/187,220, filed on Jun. 15, 2009.

(51) Int. Cl.

| | |
|---|---|
| *G06F 3/048* | (2013.01) |
| *G06F 3/00* | (2006.01) |
| *H04W 4/00* | (2009.01) |
| *H04L 12/58* | (2006.01) |
| *H04L 12/18* | (2006.01) |
| *H04W 4/14* | (2009.01) |

(52) U.S. Cl.
CPC ........ *H04L 12/5895* (2013.01); *H04L 12/1859* (2013.01); *H04L 51/38* (2013.01); *H04W 4/14* (2013.01)
USPC ............ 715/816; 715/739; 715/780; 455/466

(58) Field of Classification Search
CPC ............... H04M 2203/1008; H04M 1/274508; H04M 1/274558; H04M 1/274583; H04M 1/274533; H04M 4/14; G06F 17/30
USPC ................ 715/739, 742, 816; 455/414.3, 466
See application file for complete search history.

(56) References Cited

U.S. PATENT DOCUMENTS

| | | | | |
|---|---|---|---|---|
| 5,873,107 | A * | 2/1999 | Borovoy et al. | 715/234 |
| 6,084,951 | A * | 7/2000 | Smith et al. | 379/93.17 |
| 6,307,549 | B1 | 10/2001 | King et al. | |
| 6,947,770 | B2 * | 9/2005 | Rydbeck | 455/564 |
| 7,072,461 | B2 * | 7/2006 | Padawer et al. | 379/355.09 |
| 7,085,257 | B1 * | 8/2006 | Karves et al. | 370/352 |
| 8,060,839 | B2 * | 11/2011 | Min et al. | 715/816 |
| 8,126,484 | B2 * | 2/2012 | Scott et al. | 455/466 |
| 8,275,398 | B2 * | 9/2012 | Boningue et al. | 455/466 |

(Continued)

OTHER PUBLICATIONS

WAP—Bearers, Feb. 9, 2005, http://m-indya.com/wap/wap_bearers.htm, retrieved using wayback machine (http://web.archive.org).*

*Primary Examiner* — Nicholas Ulrich
(74) *Attorney, Agent, or Firm* — Perkins Coie LLP

(57) ABSTRACT

A system and method for entering USSD codes through an ambiguous text entry interface. The disclosed system may be embedded in mobile devices or other devices having reduced (e.g., 12 key) keypads for text entry. The system receives text entry from users, disambiguates the text entry, and presents the user with descriptors (i.e., representative words, icons, or other visual indicators) that are associated with the entered text and correlated with USSD codes. In response to a user selecting a descriptor, the system retrieves the corresponding USSD code and causes the device to transmit a message to the USSD service. The USSD service receives the message and invokes appropriate processes to respond to the message. In some embodiments, the system presents the list of descriptors representing USSD codes to the user in an order that is related to the probability that the user will select the descriptor.

24 Claims, 5 Drawing Sheets

(56) References Cited

U.S. PATENT DOCUMENTS

| | | | |
|---|---|---|---|
| 2002/0002453 A1* | 1/2002 | Lazaridis et al. | 704/9 |
| 2003/0041030 A1* | 2/2003 | Mansfield | 705/50 |
| 2004/0128138 A1* | 7/2004 | Andrews et al. | 704/275 |
| 2004/0171375 A1* | 9/2004 | Chow-Toun | 455/418 |
| 2005/0141487 A1* | 6/2005 | Mansfield | 370/352 |
| 2007/0156747 A1 | 7/2007 | Samuelson et al. | |
| 2007/0285397 A1* | 12/2007 | LaPointe et al. | 345/169 |
| 2008/0244446 A1 | 10/2008 | LeFevre et al. | |
| 2008/0309617 A1* | 12/2008 | Kong et al. | 345/157 |
| 2009/0270077 A1* | 10/2009 | Fiorini et al. | 455/414.1 |
| 2009/0275307 A1* | 11/2009 | Kahn | 455/404.1 |
| 2009/0300492 A1* | 12/2009 | Venkatesan et al. | 715/702 |

\* cited by examiner

DISAMBIGUATION OF USSD CODES IN TEXT-BASED APPLICATIONS

CROSS-REFERENCE TO RELATED APPLICATION(S)

This application claims the benefit of U.S. Provisional Patent Application No. 61/187,220 filed Jun. 15, 2009, which is hereby incorporated herein by reference in its entirety. This application is related to commonly assigned U.S. Pat. No. 6,307,549, entitled REDUCED KEYBOARD DISAMBIGUATION SYSTEM which is hereby incorporated herein by reference in its entirety.

BACKGROUND

People increasingly are using mobile devices, such as cell phones, to input and send text-based communications to one another. For example, people write text messages, instant messages, and emails with these devices and use them as forms of inter-personal communication. Unfortunately, the input of text using hand-held and other mobile or personal devices is often hampered by the number of keys on a device's keypad. Keypads on a mobile device typically have fewer keys than the number of letters, punctuation symbols, and other characters that need to be entered by a user. As a result, various systems have been developed to simplify the entry of text with reduced keyboards. For example, disambiguation systems such as the T9 and XT9 systems by Nuance Communications, Inc., of Burlington, Mass., delimit text sequences received from reduced keyboards to match the received sequence (or partial sequence) with words having the same letter sequences. For example, when a user enters "7-2-6" a disambiguation system may present the words "ram" or "pan."

While disambiguation systems work particularly well for the entry of text, users often use the keypads to enter information related to other applications. For example, users may use the keypad to enter messages, such as messages transmitted under the Unstructured Supplementary Service Data (USSD) protocol, a standard for transmitting information over GSM channels. Normally, USSD messages are used as triggers to invoke independent calling services, such as services that receive queries for information. For example, upon receiving input from a user, a mobile device may transmit a USSD message to retrieve an account balance, a stock quote, a sports score, current weather information, and so on. A server receiving the message may then respond with a menu of user-selectable choices. For example, a user may send a USSD message to query for weather information, and receive a message that causes the user's mobile device to display a menu of different cities. The user can then select a city and receive weather information about that city. USSD is often used in such cases because response times are faster and messages may be longer compared to other messaging protocols (such as SMS).

The entry of USSD codes to send USSD messages, however, can often be tedious and time consuming for a user, in part because of how USSD codes are structured. USSD codes generally take on the form of *999*9999*999*#, with a "*" as a separator and a "#" to signify the end of a message. For example, the user requesting weather information may be required to enter *150*1234*12# or another similar string of numbers. These number strings are not memorable and often cannot be entered quickly. Additionally, despite the current use of USSD to transmit and receive information, a user may not be aware of services supported by USSD or their associated number string.

Also, access to USSD based applications, such as applications that receive messages (such as the number string described above) over a network and push information (such as the menu described above) to a mobile device, are inconvenient or difficult to access with a typical mobile device. For example, typical mobile devices require users to transmit USSD messages via a SIM toolkit, a text window, or a USSD dialer.

These and other problems exist with respect to utilizing USSD in mobile devices and other devices, such as devices with reduced keyboards.

DETAILED DESCRIPTION

Figure 1:
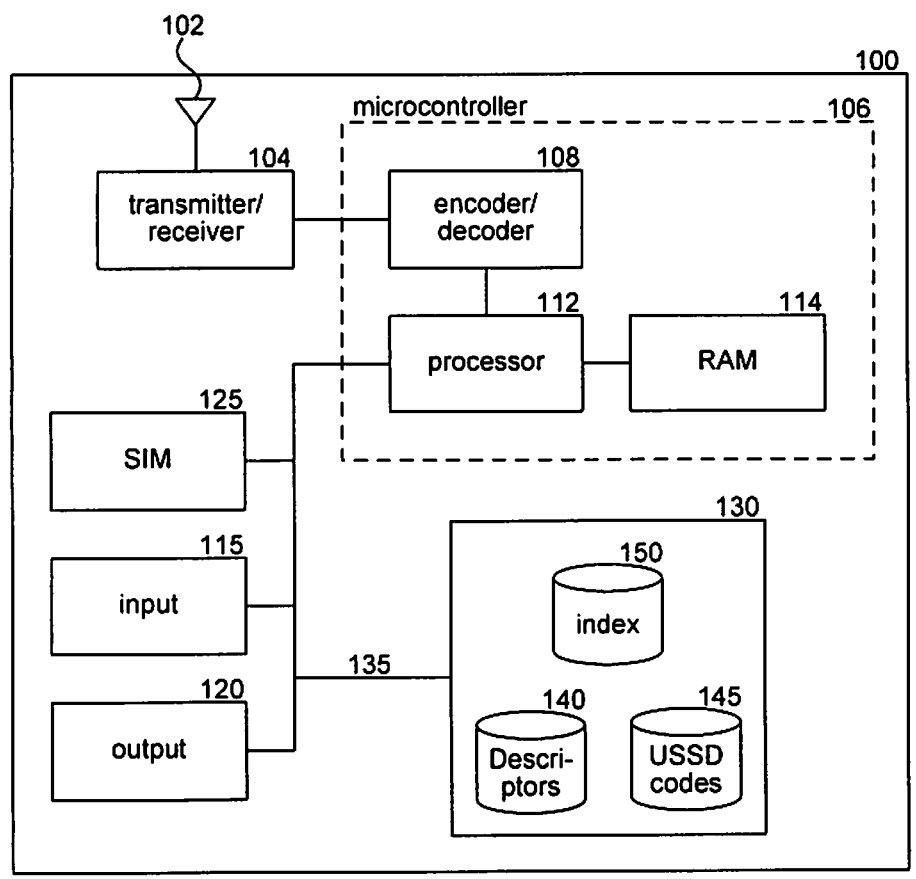
FIG. 1 is a block diagram of a representative mobile device on which USSD code disambiguation methods may be implemented.

A system and method for entering USSD codes through an ambiguous text entry interface is disclosed. The disclosed system may be embedded in mobile devices or other devices having reduced (e.g., 12 key) keypads for text entry. The system receives text entry from users, disambiguates the text entry, and presents the user with descriptors (i.e., representative words, icons, or other visual indicators) that are associated with the entered text and correlated with USSD codes. For example, as a user enters the sequence "9-3-2," the system disambiguates the word "weather" from the entered sequence, identifies one or more descriptors (each representing a USSD code) related to weather, and generates and displays a list of descriptors to allow a user to select one of the USSD codes. The descriptors are typically user-friendly characterizations of USSD codes, such as "weather in current location," "weather in Seattle," "weather in NYC," "weather forecast," an icon of a sun, and so on. In response to a user selecting one of the descriptors in the list, the system retrieves the corresponding USSD code and causes the device to transmit a message to the USSD service. The USSD service receives the message and invokes appropriate processes to respond to the message with the requested information.

In some embodiments, the system presents the list of descriptors representing USSD codes to the user in an order that is related to the probability that the user will select the descriptor. Those descriptors that are most likely to be selected are listed first, and those descriptors that are least likely to be selected are listed last. As the user selects various descriptors from multiple lists that are displayed over time (e.g., lists displayed during a single user session or lists displayed across multiple sessions), the ordering of the descriptors may be modified to reflect the personal preferences of the user.

In some embodiments, the system receives an entry of characters that correspond to a portion of a USSD code, interprets the characters as a portion of a USSD code, and presents the user with a list containing descriptors representing the USSD codes. For example, as a user enters the sequence "*150*" the system presents the user with a list of descriptors representing USSD codes that match the entered sequence. For example, the system may display "weather" (e.g., *150*123456#), "stocks" (e.g., *150*234345#), "make payment" (e.g., *150*363534#), and so on.

In some embodiments, the system may employ some or all applications available on a device as an entry point to identify USSD codes. For example, a user may launch a text entry window related to an SMS application running on a device, and begin entering text. During text entry, the system may disambiguate the text and display to the user a menu that includes matched words as well as matched USSD descriptors. The system may display an indicator or other symbol next to or with the descriptor to identify the descriptor as representing a USSD code. For example, during the entry of "9-3-2" the system may present a menu that includes the following choices: "weather," "wear," and "weather (USSD) ." The user can then select one of the first two choices in order to add a word to the entered text, or can select the last choice in order to send a USSD code requesting information about the weather.

In some cases, a device may send USSD codes to initiate communications using other communication protocols. For example, to access the Internet over wireless access protocol (WAP) channels, the device may transmit a USSD code signifying a request to connect to the Internet via a WAP channel, and begin the WAP-based communication session when the device receives a response to the message. In these cases, the system may use the fast, inexpensive USSD protocol to perform some or all setup procedures for other communications protocols.

The technology will now be described with respect to various embodiments and examples. The following description provides specific details for a thorough understanding of, and enabling description for, these embodiments of the technology. However, one skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain specific embodiments of the technology. Certain terms may even be emphasized herein; however, any terminology intended to be interpreted in any restricted manner will be overtly and specifically defined as such in this Detailed Description section. The headings provided herein are for convenience only and do not necessarily affect the scope or meaning of the claimed technology.

Suitable Devices

Referring to FIG. 1, a representative device 100 on which a USSD code disambiguation system may be implemented is depicted. The device 100 may be, for example, a mobile or hand-held device such as a cell phone, mobile phone, mobile handset, and so on. The device may also be any other GSM-supported device having a reduced keyboard, such as an electronic media player, a digital camera, a personal digital assistant, and so on.

The device 100 may include a transmitter/receiver 104 to send and receive wireless messages via an antenna 102. The transmitter/receiver is coupled to a microcontroller 106, which consists of an encoder/decoder 108, a processor 112, and RAM (Random Access Memory) 114. The encoder/decoder 108 translates signals into meaningful data and provides decoded data to the processor 112 or encoded data to the transmitter/receiver 104. The processor is coupled to an input module 115, an output module 120, a subscriber identify module (SIM) 125, and a data storage area 130 via a bus 135. The input module 110 receives input representing text characters from a user and provides the input to the processor 112. The input module may be a reduced keypad, i.e., a keypad wherein certain keys in the keypad represent multiple letters such as a phone keypad. With a reduced keypad, depressing each key on the keypad once results in an ambiguous text string that must be disambiguated. The input module may alternatively be a scroll wheel, touch screen or touch pad (implementing, for example, a soft keyboard or hand-writing recognition region), or any other input mechanism that allows the user to specify a string of one or more characters requiring disambiguation. The output module 120 acts as an interface to provide textual, audio, or video information to the user. The output module may comprise a speaker, an LCD display, an OLED display, and so on. The device may also include a SIM 125, which contains user-specific data.

Data and applications software for the device 100 may be stored in a data storage area 130. Specifically, one or more software applications are provided to implement the USSD code disambiguation system and method described herein. The data storage area 130 may include a representative descriptors database 140 that stores words, icons, or other visual identifiers that represent USSD codes, and a USSD code database 145 that stores the number strings and other associated information that comprise USSD codes. The data storage area 130 also includes an index 150 that stores a correlation between a received text string, one or more descriptors that are associated with the received text string, and one or more USSD codes associated with the descriptors. The correlation between the received text string and one or more descriptors (and corresponding USSD codes) may be manually generated, automatically generated by a service that interprets USSD codes and descriptive materials about such codes, or by other methods such as those described in U.S. Patent Publication No. 20070156747 entitled "Mobile Device Retrieval and Navigation" (filed 12 Dec. 2006). The index may be structured so that the descriptors (and corresponding USSD codes) are listed in an order that is correlated with the likelihood that the descriptor will be selected by the user. In some embodiments, the index may take a similar form to the vocabulary modules described in U.S. Pat. No. 6,307,549, entitled REDUCED KEYBOARD DISAMBIGUATION SYSTEM. The representative descriptor database, the USSD code database, and the index may be pre-installed on the device 100, may be periodically uploaded in part or whole to the device, or may be generated and/or expanded by the device user. That is, a user may add, modify, or delete USSD codes from the database and manually or automatically associate appropriate descriptors to the USSD codes. Allowing the user to modify the database and index ensures that the descriptors will be those that the user finds beneficial when selecting a USSD service.

As will be described in additional detail herein, the input module 115 receives a text string from a user. The USSD code disambiguation system uses the index 150 to identify one or more descriptors from the database 140 that are associated with the received text string. For example, if the system receives input data related to the text sequence "7-3-7-8," ("rest") one or more descriptors containing the word "restaurant" may be identified in the database 140. Alternatively, the USSD code disambiguation system uses the index 150 to identify one or more USSD codes from the database 145 that are correlated with the received text string. For example, if the system receives the number sequence "*150\," a number string "*150\*134\*345#*" may be identified in the database 145. Once identified, the system outputs some or all identified descriptors or descriptors associated with identified USSD codes to the user via the output module 120**. For example, a list of descriptors may be displayed to the user via a graphical user interface. The system then allows the user to select a descriptor to begin a USSD session.

FIG. 1 and the discussion herein provide a brief, general description of a suitable device in which the USSD code disambiguation system can be implemented. One skilled in the relevant art can readily make modifications necessary to the blocks of FIG. 1 based on the detailed description provided herein. Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a wired or wireless communications network, such as a Local Area Network (LAN), Wide Area Network (WAN), or the Internet. In a distributed computing environment, program modules may be located in both local and remote memory storage devices. For example, the index 150, descriptors database 140, and USSD codes database 145 may be stored remotely from the device.

USSD Code Disambiguation

Figure 2:
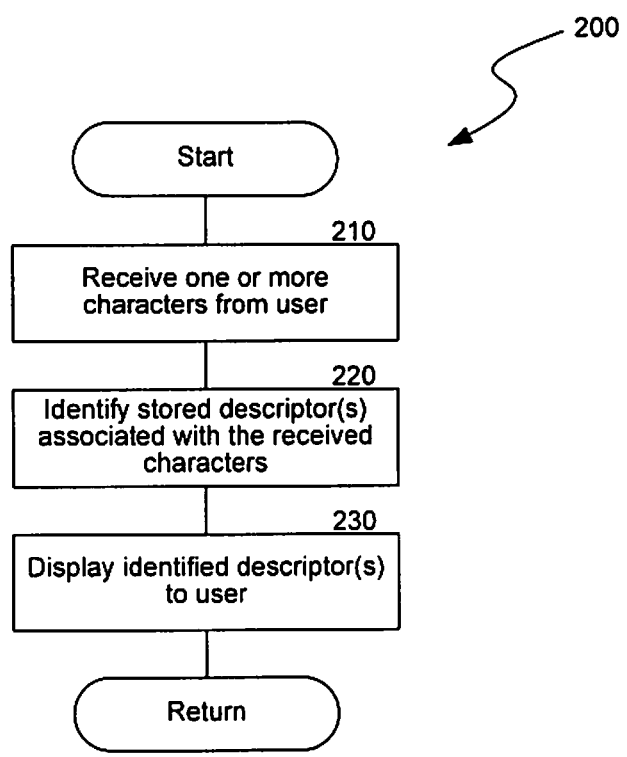
FIG. 2 is a flow diagram illustrating an example routine for identifying a descriptor associated with a USSD code.

Referring to FIG. 2, a flow diagram illustrating an example routine 200 for identifying a descriptor associated with a USSD code is described. FIG. 2 and other flow diagrams described herein do not show all functions or exchanges of data, but instead they provide an understanding of commands and data exchanged under the system. Those skilled in the relevant art will recognize that some functions or exchanges of commands and data may be repeated, varied, omitted, or supplemented, and other aspects not shown may be readily implemented.

At block 210, the system receives text input from a keypad or other input module. For example, a user utilizing a text messaging application on his/her mobile device may begin to enter a text sequence via the numeric keypad of the mobile device. The user may enter the text sequence via a text disambiguation application, such as T9, where ambiguous keys are pressed and words are identified based on disambiguation techniques. Alternatively, the user may enter the text sequence by pressing an individual key multiple times to find a letter or character.

At block 220, the system matches the received text from the user with one or more descriptors stored in a database, such as descriptor database 140. The system may match the received text to a single descriptor, to multiple descriptors, or the system may not retrieve any matches. For example, the system may match the word "check" with the descriptors "check my balance," "check my minutes," "check the weather," "check baseball scores," and so on. In some embodiments, the system may also interpret the received text as all or a portion of a USSD code. For example, the system may match the character entry "*145*" (which generally relate to payment USSD services) with USSD codes that have descriptors indicating that they pertain to "pay heat bill," "pay phone bill," "transfer funds," and so on.

The received text that is matched by the system to a descriptor may correspond to a phrase, a word, or a character fragment comprising part of a word. For example, the system may receive a sequence of "w-a" and match the sequence with representative descriptors related to Washington weather (<u>Wa</u>shington weather), WAP (<u>wa</u>p), awake (a<u>wa</u>ke), and so on. Thus, the system may match defined sequences, partial sequences, unambiguous sequences, ambiguous sequences and so on with different and unique descriptors.

In some cases, the system may wait to start the matching process until after a user has completed his or her text entry. For example, the system may receive an entered sequence of "Can I check the weather?" from a user. The system may be configured to start the matching process after punctuation indicating the end of a sentence has been detected (e.g., a period, question mark, exclamation mark), or the system may receive a manual indication from the user to initiate the matching process. In the above example, the system may therefore determine that the words "check" and "weather" match a stored descriptor (or a number of descriptors), and inform the user of the match. That way, the user may be able to discover USSD codes without knowledge of their corresponding descriptors. In other cases, rather than wait until after a user has completed text entry, the system may match received text as the user enters the text. In these cases, the system provides descriptor matches for each partial and full word as the user enters each character.

In some cases, the databases that the system accesses to retrieve descriptors or USSD codes may not be stored locally to the device. In these cases, the system would make a request to a remote service accessed over a network (such as the Internet) to receive descriptors or USSD codes that match the received text string. The remote service would match the received text string to one or more databases and return one or more descriptors and corresponding USSD codes, or USSD codes and corresponding descriptors, to the system.

At block 230, the system displays representative descriptors to the user that match or are related to the received text. For example, the system may display a list to a user via the display on the mobile device. The list may contain one or more of the identified descriptors that are related to the received text. The items in the list may be ordered based on a variety of different factors, such as based on a determined likelihood of accuracy in disambiguation, based on historical information related to prior USSD sessions by the user or by a group of users, based on the context in which the text was received such as the surrounding text entered by the user, based on a frequency of occurrence of a descriptor when following or preceding a linguistic object or linguistic objects, based on the proper or common grammar of the surrounding text, and based on known information about the user such as the location of the user, the gender of the user, or the various interests of the user. Moreover, the system may include in the list a variety of non-descriptor based words or visual indicators. For example, the system may display a list having as a first entry a word that matches or is related to the received text, as a second entry a descriptor, and as a third entry an option to view additional choices. The list may be conveyed to the user in a variety of different formats, including via one or more menus, lists, separate or overlaid screens, audio tones or other output, and so on.

In some cases, the system may present the descriptors with symbols or other displayed information that indicates the descriptor is representative of a USSD code. For example, a menu may include a first entry of "weather" (a non-USSD item) and a second entry of "weather (USSD)" (indicating that the entry is a descriptor). Other examples of symbols or other displayed information that indicate that the displayed item is a descriptor include:

"check the weather" (implied by the use of the verb "check")

"weather (send message)" (indicated by the use of the term "message")

"weather ▶" (where the arrow icon indicates that the entry is a descriptor)

Figure 3:
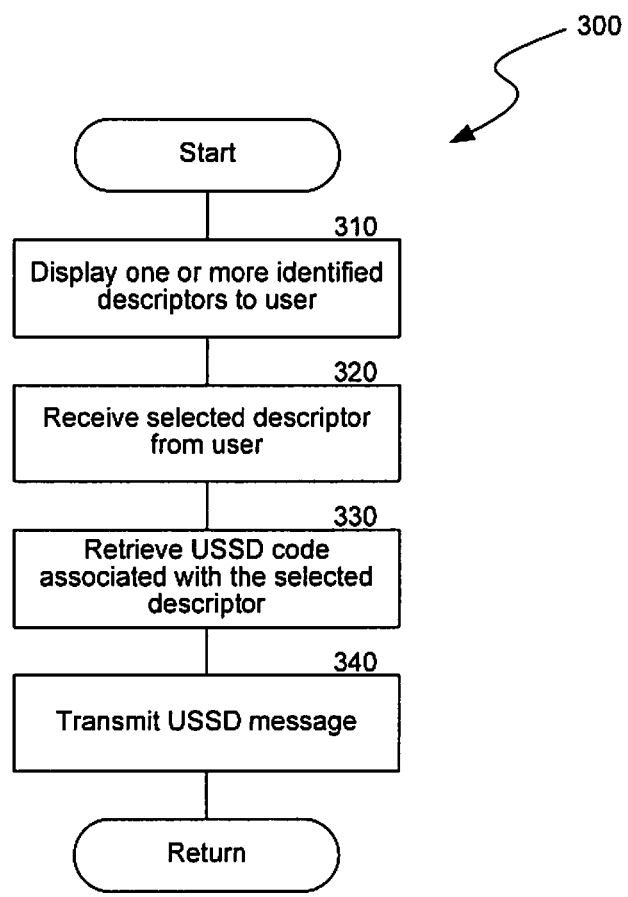
FIG. 3 is a flow diagram illustrating an example routine for a user to transmit a USSD message.

Referring to FIG. 3, a flow diagram illustrating an example routine 300 for transmitting a message to initiate a USSD service is described. At block 310, the system displays a list of descriptors to a user. For example, the descriptors may be related to the entered word (such as three descriptors related to the word "check"). The descriptors may also be related to a partial USSD code received in a text entry box or application. Each descriptor in the list of descriptors may include a visual identifier that indicates that the descriptor is associated with a USSD service. The list may also include descriptors that are icons, such as icons and other displayable media described in commonly assigned U.S. Publication No. 20080244446, filed on Mar. 29, 2007, entitled DISAMBIGUATION OF ICONS AND OTHER MEDIA IN TEXT-BASED APPLICATIONS. For example, the list may include a sun or rain cloud icon to represent a USSD service associated with weather.

At block 320, the system receives a selection of a descriptor from a user. For example, the system displays a list and receives a selection of one of the items in the list. The system may enable the user to scroll and select from the list via one or more keys on the keypad, via other control keys, via soft keys within the displayed list, via audio input, and so on.

The system may modify or otherwise rearrange or manipulate the list in order to facilitate a user's selection of an item in the list. In some cases, user displays on mobile devices are small or of low quality, and displayed descriptors may be difficult to decipher. The system may therefore enlarge one or more items in the list for a user. For example, as a user scrolls a list, the system may provide an enlargement of each item in the list as the user examines each item. The system may also enhance the graphic or quality of an item as the user selects or scrolls to the item in the list. For example, the system may normally provide a low quality display of all the items in the list, and enhance an item in the list (such as by enhancing the colors, resolution, and so on), when a user moves a cursor to the descriptor. Additionally, the system may display the corresponding USSD code represented by the descriptor when the user hovers a cursor over the descriptor or moves to select the descriptor. Other modifications to the display of lists are of course possible.

At block 330, the system retrieves the USSD code and any other information that corresponds to the selected descriptor. The USSD code and other information contains sufficient information for the system to initiate a USSD service or request information from a USSD service by transmitting a USSD message to the service.

At block 340, the system causes the mobile device to transmit a USSD message. That is, after a user selects a descriptor from a displayed list, the system utilizes the USSD code corresponding to the selected descriptor to transmit a USSD message to a recipient service, such as a USSD application in communication with the device over a GSM network. As described above, the system may transmit the USSD message to obtain information, such as weather information, sports information, user account information, and so on, or to initiate a session with a different application, to be discussed below.

It will be appreciated that the system provides a user with many different ways to search for and retrieve USSD codes and initiate USSD-based services without forcing the user to spend a significant amount of time searching through lists of USSD codes or relying on memory or prior knowledge in order to identify the desired USSD codes.

Figure 4:
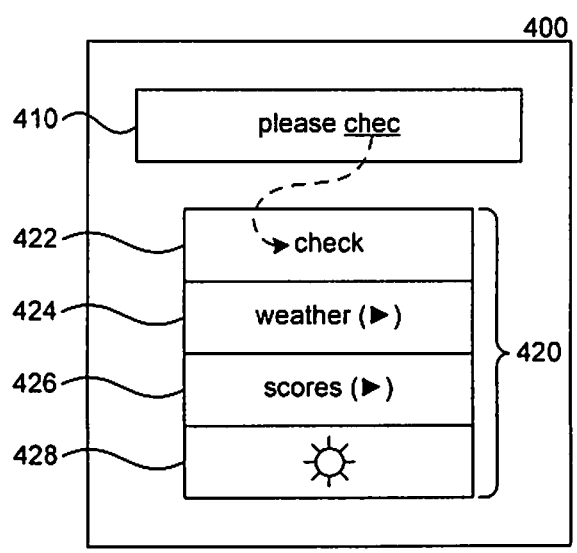
FIG. 4 is a representative user interface screen displaying a list of descriptors that represent USSD codes.

FIG. 4 is a diagram showing an example user interface screen 400, such as may be present on a mobile device, displaying a list of descriptors. The user interface provides facilities to receive input data, such as a form with field(s) to be filled in, pull-down menus allowing one or more of several options to be selected, buttons, sliders, hypertext links or other known user interface features for receiving user input. While certain ways of displaying information to users is shown and described with respect to the user interface, those skilled in the relevant art will recognize that various other alternatives may be employed.

User interface screen 400 and other screens may be stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), Flash format, or matrix or bit-mapped formats.

User interface screen 400 includes an input entry field 410, such as a text entry field within a text messaging application, instant messaging application, email application, main entry screen, or other text-based application of a mobile device. During entry of characters, the system displays a list 420 or other menu when the system matches a user input sequence of characters with one or more descriptors or USSD codes stored in local or remote databases. The list 420 may be automatically displayed by the system, or may be displayed when requested by the user. For example, in FIG. 4, the text sequence of "2-4-3-2" entered by a user matches a number of different representations, including a textual representation 422 of "check" (disambiguated using a text disambiguation system, such as the T9 system), a first descriptor (weather ▶) 424, a second descriptor (scores ▶) 426, and a third descriptor (✹) 428. The list 420 may also include number strings and other representations of USSD codes not shown in the figure.

When a list 420 is displayed, the system allows the user to select one or more items in the list. The selection may be made by the user by moving a cursor over an item in the list and pressing an "enter" or "select" key, by selecting a particular function key that is tied to a particular item in the list (e.g., a first function key tied to the first item, a second function key tied to the second item), or by any other selection method.

Initiation of Other Applications Using USSD Codes

As discussed above, in some cases the system uses a USSD code, such as a code selected using the methods described herein, to initiate a session with a different communication protocol. For example, a user may wish to use a map application (such as Google Maps), and may enter a representative word or a number string that causes the user's mobile device to send a USSD message indicating the user's desire to launch the map application.

Figure 5:
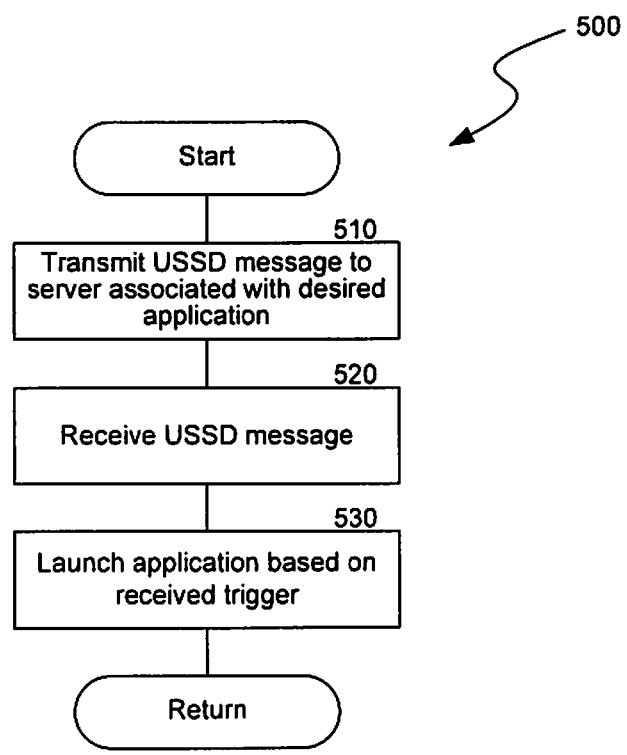
FIG. 5 is a flow diagram illustrating an example routine for setting up a communication channel using a USSD initiation message.

FIG. 5 is a flow diagram illustrating an example routine 500 for setting up a communication channel by selecting a USSD code. At block 510, the device, upon receiving input from a user, transmits a USSD message to a server associated with a desired application. For example, a user enters a character sequence "w-a-p" and selects an item from a list of descriptors related to the sequence. Upon receipt of the selection, the device transmits a USSD message associated with the selected item. In this example, the device transmits a USSD message that indicates a desire to begin a WAP-based session.

At block 520, the device receives a USSD message in response to the transmitted message. For example, a server associated with a WAP application on the device receives the transmitted message and returns a USSD message to the device, such as a message that acts as a trigger to launch the WAP application on the device.

At block 530, the device launches an application based on the received USSD message. For example, the device receives a trigger in the form of a USSD message and launches the WAP application. The device may then switch modes and transmit any further communications over the WAP channel. Thus, the system is able to utilize the inexpensive and fast USSD channels when initiating an application on a device.

Conclusion

The above detailed description of embodiments of the technology is not intended to be exhaustive or to limit the technology to the precise form disclosed above. While specific embodiments of, and examples for, the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While various embodiments are described in terms of the environment described above, those skilled in the art will appreciate that various changes to the facility may be made without departing from the scope of the invention. For example, descriptor database 140, USSD code database 145, and index 150 are all indicated as being contained in a general data store area 130. Those skilled in the art will appreciate that the actual implementation of the data storage area 130 may take a variety of forms, and the term "database" is used herein in the generic sense to refer to any data stored in a structured fashion that allows data to be accessed, such as by using tables, linked lists, arrays, and so on.

From the foregoing, it will be appreciated that specific embodiments of the invention have been described herein for purposes of illustration, but that various modifications may be made without deviating from the spirit and scope of the invention.

I claim:

1. A method on a mobile device for presenting user-selectable actions to be performed over a USSD channel, the method comprising:
   receiving a text string from a user via an input component of the mobile device;
   identifying two or more descriptors that relate to the received text string, wherein a descriptor is a user-interpretable characterization of a USSD code, and wherein the two or more descriptors are identified by their association with the received text string in a stored index;
   presenting identified descriptors and a visual cue with each descriptor via a display component of the mobile device, each visual cue indicating that selection of a descriptor initiates a corresponding action performed by the mobile device over the USSD channel, such that the visual cues distinguish USSD code descriptors;
   receiving a selection of a descriptor;
   retrieving the USSD code characterized by the selected descriptor; and
   transmitting the retrieved USSD code to initiate the corresponding action associated with the selected descriptor.

2. The method of claim 1, wherein receiving a text string from a user via an input component of the mobile device includes receiving the text string via a reduced keyboard of the mobile device.

3. The method of claim 1, wherein receiving a text string from the user via an input component of the mobile device includes receiving the text string via an instant messaging application or a text messaging application running on the mobile device.

4. The method of claim 1, wherein identifying two or more descriptors that relate to the received text string includes identifying at least one descriptor stored in a storage area on the mobile device.

5. The method of claim 1, wherein identifying two or more descriptors that relate to the received text string includes identifying at least one descriptor stored at a remote location from the mobile device.

6. The method of claim 1, wherein the identified two or more descriptors are presented in an order that is likely to be selected by the user.

7. The method of claim 1, wherein presenting the identified two or more descriptors includes presenting information that represents a descriptor associated with a request for information.

8. The method of claim 1, wherein presenting the identified two or more descriptors includes presenting information that represents a descriptor associated with launching an application on the mobile device.

9. The method of claim 1, wherein presenting the identified two or more descriptors includes presenting information associated with a descriptor and presenting information not associated with a descriptor.

10. The method of claim 1, wherein identifying two or more descriptors that relate to the received text string includes identifying at least one icon representing a USSD code.

11. The method of claim 1, wherein presenting identified descriptors includes displaying a list including descriptors, ordered based on context for the received text string.

12. The method of claim 11, further comprising displaying suggestions of disambiguated words that relate to the received text string, wherein user selection of a suggested word causes text entry of the selected word,
   such that the displayed list includes descriptors and suggested words ordered based on context for the received text string.

13. A system for disambiguating user input associated with actions performed by a mobile device over a USSD channel, the system comprising:
   a memory storing computer-executable instructions of:
      an input module, wherein the input module is configured to receive a character string from a user of the mobile device;
      an identification module, wherein the identification module is configured to identify one or more descriptors associated in a stored index with the received character string, each descriptor characterizing a USSD code in a user-interpretable manner;
      a display module, wherein the display module is configured to display identified descriptors and a visual cue with each descriptor, each visual cue indicating that selection of a descriptor initiates a corresponding action performed by the mobile device over the USSD channel, such that the visual cues distinguish USSD code descriptors, and wherein the input and identification modules are further configured to receive a selection by the user of displayed information reflecting one of the identified descriptors and provide the USSD code characterized by the selected descriptor to a service to initiate the action associated with the USSD code; and a processor for executing the computer-executable instructions stored in the memory.

14. The system of claim 13, wherein the input module, identification module, display module, and performance module are defined by instructions stored in memory of the mobile device.

15. The system of claim 13, wherein the input module receives a character string of numbers from a reduced keyboard of the mobile device, and wherein the identification module identifies one or more USSD codes that include the received string of numbers.

16. The system of claim 13, wherein the input module receives a character string of numbers from a reduced keyboard of the mobile device, and wherein the identification module identifies one or more USSD codes that include letters represented by the received string of numbers on the reduced keyboard.

17. The system of claim 13, wherein the input module receives a character string of letters from a full keyboard of the mobile device, and wherein the identification module identifies one or more USSD codes that include the received string of letters.

18. The system of claim 13, wherein the identification module identifies one or more USSD codes associated with the received character string from a database stored in the mobile device.

19. The system of claim 13, wherein the identification module identifies one or more USSD codes associated with the received character string from a database stored remotely from the mobile device.

20. The system of claim 13, wherein the display module displays a menu of user-selectable options each associated with the identified one or more descriptors.

21. The system of claim 13, wherein the displayed one or more descriptors are ordered based on a determined likelihood of selection by the user of the mobile device.

22. A non-transitory computer-readable medium whose contents, when executed by a processor of a mobile device, cause the mobile device to perform a method for requesting information over a USSD channel, the method comprising:

receiving a sequence of characters via a keyboard of the mobile device;

identifying two or more information request options that are associated in a stored index with the received sequence of characters, wherein an information request option is a user-interpretable characterization of a USSD code;

displaying identified information request options and a visual cue with each displayed information request option via a display component of the mobile device, each visual cue indicating that selection of an information request option initiates an associated action performed by the mobile device over the USSD channel, such that the visual cues distinguish USSD code information request options;

receiving a selection of one of the identified information request options displayed with a visual cue;

transmitting the USSD message characterized by the selected information request option; and presenting content received in response to the transmitted USSD message.

23. The non-transitory computer-readable medium of claim 22, wherein the sequence of characters includes a sequence of numbers, and wherein identifying two or more information request options associated with the received sequence of characters includes identifying two or more USSD codes that include the sequence of numbers.

24. The non-transitory computer-readable medium of claim 22, wherein the sequence of characters includes a sequence of letters, and wherein identifying two or more information request options associated with the received sequence of characters includes identifying two or more USSD codes that include the sequence of letters.

* * * * *